UNITED STATES PATENT OFFICE.

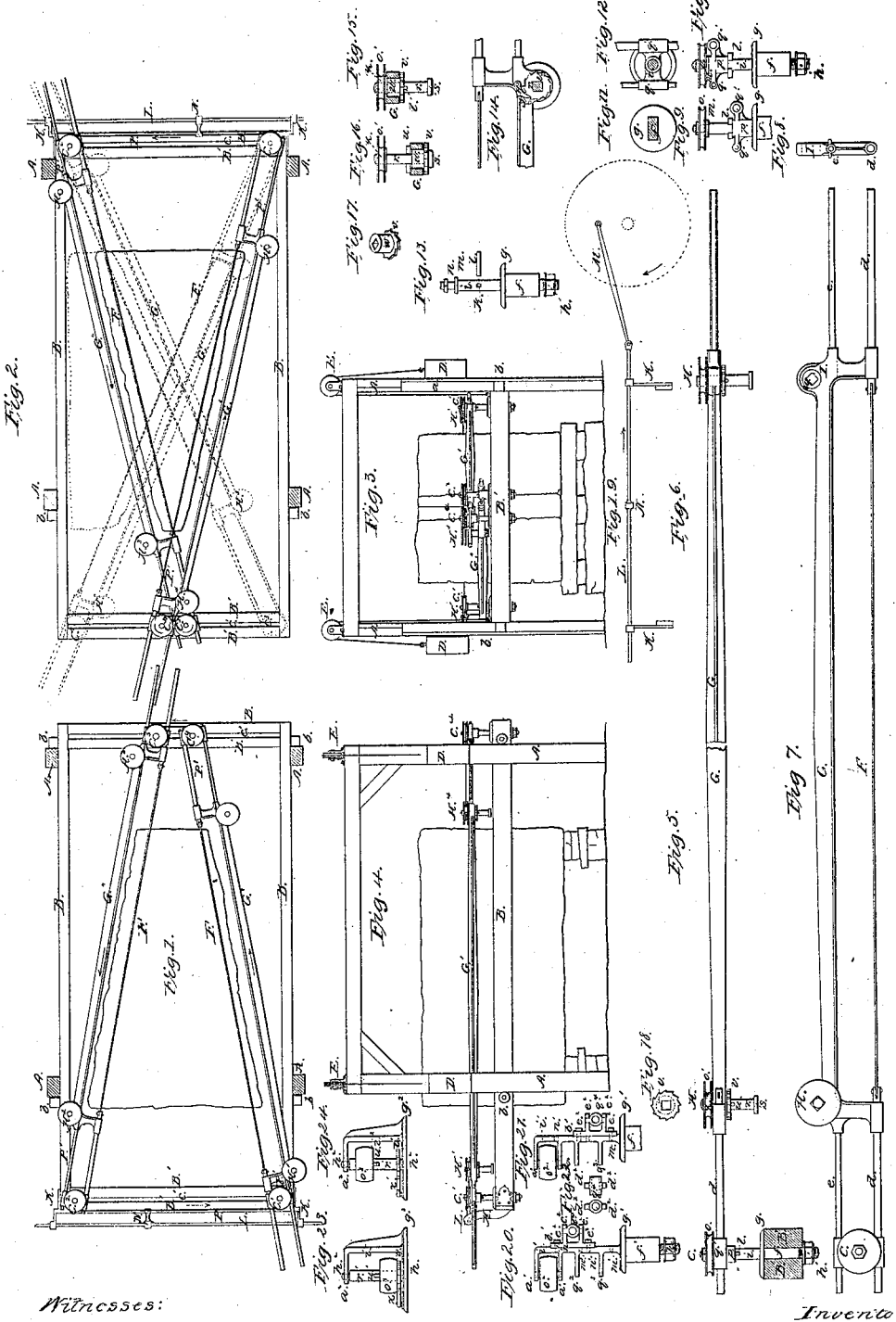

PHILIP SCHRAG AND W. J. von KAMMERHUEBER, OF WASHINGTON, DISTRICT OF COLUMBIA.

MACHINE FOR SAWING MARBLE IN OBELISK FORM.

Specification of Letters Patent No. 14,296, dated February 19, 1856.

*To all whom it may concern:*

Be it known that we, PHILIP SCHRAG and WILDERICH JOSEPH VON KAMMERHUEBER, both of the city of Washington, in the District of Columbia, have invented a new and useful Machine for Sawing Two Tapering Sides of a Marble Block at Once by Means of a Reciprocating Motive Power; and we do hereby declare that the following is a full, clear, and exact description of the same, reference being had to the annexed drawing, and to the letters of reference marked thereon, forming a part of this specification, and in which—

Figure 1, is a ground plan of our machine; the two saws set tapering and both being in the same height above the sliding frame. The direction of the motion is marked with arrows. Fig. 2, is a ground plan of our machine; the two saws set crosswise, one above the other. The direction of the motion is also marked with arrows. Fig. 3, is a front view of the same, as represented in Fig. 2. Fig. 4, is a side view of the same, as represented in Fig. 2. Fig. 5 is an inner view of a detached saw-frame, G, and Fig. 6 an outside view of the same. Fig. 7 represents a ground plan of a detached sawframe, G, and Fig. 8 a front view of it. Fig. 9 represents a front view of the saw-supporters, C, detached from the sliding frame, B B'; the collar, $p$, being in the lower position. Fig. 10 is a front view of the same supporter, the collar, $p$, being in the upper position. Fig. 11 is a view from below of a section through the part, $f$, of Fig. 10. Fig. 12 is the ground plan of a horizontal section, taken between the roller, $o$, and the collar, $p$, of Fig. 10. Fig. 13 is the shaft and footpiece of the supporter. Fig. 14 is a view from below of a part of the sawframe, G, showing the ratchet wheel, $v$, with the pull or catch, $x$, and the spring, $y$, which are parts of the straining apparatus, H, for the belt, rope or chain, connecting the two sawframes G' and $G^2$. Fig. 15 is a side view of this straining apparatus, H, the roller or drum, $o'$, resting on the sawframe, G. Fig. 16 represents a side view of the same, the roller or drum, $o'$, being raised above the sawframe, G. Fig. 17 is a perspective view of the ratchet wheel, $v$, with its collar, $w$, detached from the straining apparatus. Fig. 18 is a view from below of that ratchet wheel, $v$. Fig. 19 represents the manner in which the motive power may be applied to the rope or its equivalent. The direction of the motion is marked with arrows. Fig. 20 represents a front view of another arranged saw supporter, the guide-box, $q^4$, being in its higher position. Fig. 21 is the side view of the same, the guide box, $q^4$, attached in its lower position. Fig. 22 represents two side views of the guide-box, $q^4$. Fig. 23 is a side view of an other arranged straining apparatus, the pulley, $o^3$, being in its lower position. Fig. 24 is the side view of the same apparatus, the pulley, $o^3$, being in its higher position.

Similar letters of reference in each of the several figures indicate corresponding parts.

This invention relates to certain new and useful improvements in machines for sawing two tapering sides of a marble block at once by a reciprocating motive power, whereby the operation of adjusting and setting the saws at any desired angle is greatly facilitated, and also rendered more perfect, than in similar machines of the same design; the necessary strain between the two sawframes regulated with more ease at any time and position, and no part of the motive power lost, by transmitting the same in the direction of the saws.

To enable others skilled in the art to make and use our invention, we will proceed to describe its construction and operation.

The upright frame, represented in Fig. 3 and Fig. 4, consists of four posts A, connected on the top by cross pieces. These posts are provided with iron slide ways $a$, Fig. 3, and serve as guide posts to the sliding frame, B B', which is placed between them. The sliding frame is composed, as shown in Figs. 1 and 2 of two longitudinal timbers, B, provided with guide rollers, $b$, to bear upon the iron slideways, $a$; of four crosspieces, B', two of which connect the timbers, B, on each of their ends. These crosspieces are placed in such a manner as to leave a small space or channel, $c$ and $c'$, between them, for the purpose of receiving the saw supporters, C.

D in Figs. 3 and 4 represents an adjustable counterweight, to balance the sliding frame and its appendages. These counterweights are suspended by a rope, running over rollers, E, secured on the top of the upright frame.

The two saw straps, F, Figs. 1, 2 and 7 are strained in frames, G, made of any suitable material and represented in the drawings, as horizontal frames, which we would prefer on account of the smaller weight and lesser space, they require in comparison with vertical ones, although such may be used on the same place. The sawframe, G, is provided on its ends with rods, $d$ and $e$, of which the rods, $d$, serve as guide rods, to maintain the sawstrap in the direction of the motion, and the rod, $e$, preserve the horizontal position of the sawframe G which would otherwise turn around the rods, $d$. The socket I Figs. 7 and 8 on each end of the frame, G, is to receive the rope-straining apparatus, H, afterward to be described.

The saw supporter, C, represented in Figs. 9, 10, 11, 12 and 13 consists, 1, of a solid footpiece, $f$, of a rectangular section, shown in Fig. 12, on its upper end provided with a circular or otherwise shaped plate, $g$, to rest on the crosspieces, B', of the sliding frame, and on its lower end with a screw and nut, $h$, to secure it to them and to keep it stationary. It consists, 2d, of a round shaft, $i$, screwed into the center of the plate, $g$, of the footpiece, $f$, which has in the middle, or nearly so, a square hole, $k$, to receive a pin, $l$. This shaft or cylinder terminates in a circular projection, $m$, and in a pivot or axle, $n$, of the roller or pulley, $o$, provided with screw and nut to secure the same. It consists, 3d, in the collar, $p$, which fits around the shaft, $i$, turns on the same and is provided with two horizontal journal-boxes, $q$ and $q'$, to receive the respective rods, $c$ and $d$, of the saw frame, G, sustaining the same in the horizontal position and guiding them in the desired direction of the motion. The journal box, $q$, serves as slide rest to the rod, $e$, and may therefore be altered into a plan or arm projecting from the collar, $p$. The collar, $p$, may assume two positions, viz: between the circular projection, $m$, and the pin, $l$, or between the pin, $l$, and the footplate, $g$; in either of these positions it is retained by the pin, $l$.

The apparatus for giving to the rope, belt or chain, P, which connects the two saw frames, G' and G², Figs. 1 and 2, the necessary strain in any direction or position of the saws, consists in, 1, a shaft, $r$, Figs. 14, 15 and 16, of a square section, as shown in Fig. 14, which has on its lower end a circular projection, $s$, and which is provided on its upper end with a stationary roller or pulley, $o'$, firmly secured to it. In the middle of the shaft, $r$, or nearly so, is a hole, $t$, to receive the pin $u$. It consists, 2d, in a ratchet wheel, $v$, and its circular collar piece, $w$, Figs. 17 and 18, which has a square perforation through its center, fitting to the shaft, $r$, and allowing it to slide up and down on the same. This collar $w$, fits also into the circular hole or socket I, Fig. 7, of the saw frame, G, and enables therefore to turn the whole straining apparatus. To the lower side of the saw frame G, Fig. 14, is attached on the required place a pawl or catch, $x$, pressed against the ratchet wheel, $v$, of the straining apparatus by the spring, $y$, to avoid the winding off of the rope, belt or chain P on the roller or pulley, $o'$, during and after the operation of straining the same. The belt, rope or chain, P, or its equivalents may be fastened to the pulley, $o'$, by means of the pin $z$, or in any other way.

The ratchet wheel, $v$, with its collar, $w$, is fixed in its position on the shaft, $r$, by the pin, $u$, and may be placed between the pulley, $o'$, and this pin, $u$, or between the pin, $u$, and the projection $s$, as required (see Figs. 15 and 16).

To give a more perfect idea of the real nature of the saw supporters and straining apparatuses, the two main features of our invention, and to show that the same object may be obtained by substituting equivalents for some parts, we give hereby a description of a so altered supporter and straining apparatus, as represented in Figs. 20–24. These two manners, to obtain the same object are equal in nature and differ only in form.

The footpiece, $f'$, with the plate, $g'$, and the set screw and nut, $h'$, are of the same construction as on the above described supporter. From this plate, $g'$, projects perpendicularly a stander, $i'$, provided on one side with two horizontal flanges $a'$ and $a'$, to serve as journals for the pulley or roller, $o^2$, and also two horizontal arms, $q^2$ and $q^3$, to serve as rests for the rod, $e$, of the saw frame, G, in its two positions; on the other side of this stander is screwed on a plate, $b'$, with two horizontal flanges $c^2$ and $c^2$ to serve as journals for the pivots $d^2$ and $d^2$ of the guide boxes $q^4$ of the rods, $d$, on the saw frame, G. This stander, $i$, has four screw holes, arranged in such a manner as to enable the attaching of the plate, $b'$, in two positions, as shown in Figs. 20 and 21, by means of the screws, $e^2$. The arms, $q^2$ and $q^3$ are secured in such a manner as to give the saw frame G, a horizontal position, when the guide-boxes, $q^4$, are in their different positions, as mentioned above. The guide boxes, as represented in Fig. 22, have attached two pivots, $d^2$, perpendicularly to the direction of the guide hole and are able therefore to turn in the two arms, $c^2$, of the plate $b'$.

The straining apparatus, represented in Figs. 23 and 24, consists of a foot plate, $g^2$, with a stander, $i^2$, and a horizontal arm $a^2$.

In the plate, $g^2$, and arm, $a^2$, are holes, $h^2$, for the pivots of the shaft, $r'$. On the lower end of the square shaft, $r'$, is firmly secured a ratchet wheel, $v'$, and this shaft, $r'$, has about the middle a hole to receive a pin, $u'$. The pulley or roller, $o^3$, which slides up and down the shaft, $r'$, rests in its lower position on the ratchet wheel, $v'$, and in its higher position on the pin, $u'$. To that roller, $o^3$, the belt, rope or chain is fastened in any way. To the foot plate, $g^2$, is secured a pawl or catch, $x'$, to drop into the ratchet wheel and prevent the shaft $r'$, and by that the roller, $o^3$, from turning back. The foot plate $g^2$ may be screwed to the end of the saw frame, G.

One of the transversal sides, B′, of the sliding frame is provided with two bearings K, to suspend a rod, L, in a horizontal position, parallel to the same side of the sliding frame and in the same height with the rollers, $o$, of the saw-supporters C. To the middle of this rod L is firmly secured an arm N, to which the belt, rope or chain, P, is fastened. The length of this arm is given by the distance of the strained belt, rope or chain, P, from the rod L. The rod L is on one of its ends united with a crank pin of a wheel by means of a connecting rod, or otherwise.

Operation. To facilitate the understanding we proceed to describe the manner of setting the sawframes and the operation of our machine. 1st. When the two sawframes, G′, G², are placed in the same height above the sliding frame; the largest angle, which is possible in that case, will be obtained, by setting two ends of the sawframes as far distant, as possible, and the two others close together. See Fig. 1. 2d. When the two sawframes are laid crosswise, one below the other, which is necessary if a larger angle is required. It is condition, as the rollers of the supporters are always in the same height and the belts &c. have to be level, that the rollers, $o'$, of the straining apparatuses have to be adjusted accordingly. See Fig. 2.

Firstly. The collars, $p$, of the four saw-supporters, C Fig. 18, are shoved down, until they rest against the plate, $g$, the pin $l$ is put through its corresponding hole $k'$, above the collar, $p$, and these rollers hereby secured, although allowed to turn freely around the shaft, $i$, of the supporters, as shown in Fig. 9. The rollers, $o'$, with the shafts, $r$, of the straining apparatuses, Fig. 15, are raised up until the projection, $s$, comes in contact with the ratchet wheel, $v$, and the pin, $u$, put in its corresponding hole above the sawframe, G. The supporters are connected with the sawframes by putting the rods $d$ and $e$ through the corresponding journal boxes $q'$ and $q$ of the collars, $p$. The sawframes with the supporters, hanging on their ends, are then brought to the sliding frame B B′, their foot-pieces, $f$, put through the passages or channels, $c$, $c'$, between the timbers B′ of the same and secured to it on the proper places by the set screws $h$, corresponding to the required angle. The belts, &c., P are fastened to the rollers $o'$, carried around the rollers $o$ of the saw supporters and strained by turning the shaft $r$ with a screw wrench, the ball or catch $x$, dropping into the ratchet wheel $v$ will then hold these belts &c. strained. By the operation of straining is to be observed, that one end of the sawframe, G′ is in contact with the supporter C′ and one end of the sawframe G² is in contact with the supporter C³, to permit the largest space for the motion of the saws. The belt, &c., P is then fastened on the rod L by means of the arm N and the machine will be ready for operation, if the marble block is brought under the sliding frame B B′ on its proper place and the same raised up. The connecting rod communicates to the rod L an alternate motion, and this will be transmitted to the sawframes, by means of the belts; one sawframe moving in the opposite direction of the other.

Secondly. In that case, represented in Fig. 2, where it is required to set the saws crosswise, one of the sawframes with its supporters may remain as it is, the other will be taken out and adjusted in the following manner: The collars $p$ are raised up until they rest against the projecting part, $m$, of the supporters, the pin $l$ taken out first, and put again in its corresponding hole $k$, which is now below the collar $p$, and in that way the same will be secured. The rollers $o'$ with their shafts $r$, on the straining apparatuses of said frame, will then be shoved down, the pin $u$ taken out first, until the roller $o'$ rests against the sawframe G; the pin $u$ will be put through its corresponding hole, $t$, which in that case is now below the ratchet wheel $v$, and the rollers $o'$ are so secured in their upper positions. This so adjusted sawframe, G, will then be laid crosswise over the other, and secured in that position. If this is done, the belts &c. P will be fastened on the rollers $o'$ and strained, in the same way as described, "firstly," only that the belt on that side of the sawframes, where the saws intersect, will be carried once all around the pulleys or rollers $o$ on the supporters, as shown in Fig. 2. When the belt is secured on the rod L by means of the arm N, the marble block and the sliding frame B B′ put on their proper places the operation will be exactly the same as described under "firstly." Although, as seen in Figs. 1 and 2, in black lines, the two saws may now form any angle from null degree upward to a certain limit, as described afterward, our machine enables also to cut obtuse angles viz: Setting the supporters and straining apparatuses just so as described under " Secondly," the saws can be arranged in such a manner, as marked with red lines in Fig. 2, where the angle, which the two saws form, fronts against the longitudinal side B of the sliding frame B B'. The saws are now able with the same power, to cut a very obtuse angle fronting against the longitudinal side of the sliding frame B B'.

If instead of the supporters C Figs. 9–12 and the straining apparatuses H Figs. 14–18, their equivalents, represented on Figs. 20–24 are to be used, the operation of setting may be as follows:

Firstly. When the two sawframes have to assume their lower positions, the screws $c^2$ of the plate $b'$ of the supporters Fig. 20 have to be drawn out, this plate $b'$, brought in the lower position marked in Fig. 21 and secured to the stander $i'$ by the same screws $e^2$ fitting into the holes $m'$ $m'$ provided for. The pins $u'$ on the straining apparatuses, as shown in Fig. 23, are then to be drawn out, the pulleys $o^3$ shoved up on the shaft $r'$ and the pins $u'$ put in again, below the pulleys as represented in Fig. 24.

Secondly. When one sawframe is to be raised above the other and to be placed crosswise over the same, the two corresponding supporters have to be adjusted, as represented in Fig. 20, by the reverse of the operation before described, and also the pulleys $o^3$ of the straining apparatuses of that sawframe to be brought in the lower position shown in Fig. 23.

From the foregoing description it may be seen that by our arrangement of the different parts, we are able to cut angles from null degree upward to a certain limit, which depends mainly on the proportions of the length of the transversal sides to the longitudinal sides of the sliding frame. In the case represented in Fig. 1 we may cut tapering marble blocks without a sharp edge; in the case represented in Fig. 2 in black lines, we are able to cut tapering marble blocks with a sharp edge and angles from 0—90 degrees, if the sliding frame B B' is square. In the case as marked in Fig. 2 with red lines, we are enabled to cut blocks of sharp edges and obtuse angles. The setting of the sawframes by means of the supporters will be found easy and exact.

The straining apparatuses with their rollers $o'$ in connection with the rollers $o$ of the supporters, are so arranged and constructed, or may be so in any other way, as to give to the parts P' of the belts, ropes or chains between them exactly a parallel direction to the motion of the saws and will retain this direction through the whole space of the motion and consequently no part of the motive power applied to the belt &c. is lost by the transmission of its direction into that of the saws. The rollers $o$ of the supporters act like the beams of a scale or an equal armed lever. In all other devices the transmitted power, making an angle with the direction of the saws, divides itself into two, one in said direction, the other perpendicular to the same; the first now only a fraction of the original moves the saws, the other presses against them, and creates therefore a very considerable friction in the guides, once more diminishing the original power.

Our machine differs therefore of any other of a similar character, 1st, by the adaptation to cut marble blocks at angles of almost every degree from 0—180°, with or without sharp edges; 2d, the necessary amount of power to cut tapering marble blocks depends not on the degree of the angle, but is given by the length of the sides to be cut; 3d, in our collars $p$, no pressure of the transmitted power exists and therefore no friction from this source; 4th, in our machine the motive power has only to move the two sawframes G' G² and not the sliding frame with its appendages and therefore only a small amount of it, is consumed, by the inertia of the masses to be moved; 5th, our mode of adjusting both the saws and the belts &c., to different required positions, is so simple and can be executed so quick, that a great deal of time and labor is hereby saved.

We do not limit ourselves to the material or form of the different parts of our machine, as long as the peculiar character of the said parts is retained and we do also not limit ourselves to the material, which shall be sawn by this machine.

We do not claim the use of pulleys, belts or their equivalents, and guides, for the sole purpose of converting the direction of the motive power into the direction of the saws, nor do we claim the straining of saws by means of belts or chains, as these all have been done prior to our invention, but

What we claim as new and of our invention, and want to secure by Letters Patent is.

1. We claim the above described use of belts or their equivalents—adjustable in their length substantially as above described—in combination with the saw frames, in which the saws are strained independently of said belts, whose adjustability is solely for the purpose of permitting change in the distance or in the angle of the saws.

2. We claim the saw supporters adjustable both horizontally and vertically substantially as described, whereby we are enabled, when cutting parallel or inclined grooves, to place the saws in the same plane that they may commence and end their work simultaneously and also, when it is desired to cut crosswise or to a point, to place the saws in different planes, the one above the other.

3. We claim the vertical adjustability of the roller $o^3$ upon the shaft $r'$ of the straining apparatus, which permits the retention of the belts in a horizontal plane, whether the saws and their frames are placed in the same or in different horizontal planes, as described.

PHILIP SCHRAG,
WILDERICH JOS. von KAMMERHUEBER.

Witnesses:
J. C. DONN,
WM. I. PARHAM.